United States Patent [19]

Rhodes et al.

[11] 3,997,315
[45] Dec. 14, 1976

[54] GLASS MELTING

[75] Inventors: William Jackson Rhodes, Prescot;
Derek Marshall, Wigan, both of
England

[73] Assignee: Pilkington Brothers Limited, St. Helens, England

[22] Filed: Apr. 25, 1975

[21] Appl. No.: 571,822

[30] Foreign Application Priority Data
Apr. 26, 1974 United Kingdom ............ 18458/74

[52] U.S. Cl. .................................. 65/135; 65/136; 65/178
[51] Int. Cl.² ......................................... C03B 5/18
[58] Field of Search ............ 65/135, 178, 179, 136

[56] References Cited
UNITED STATES PATENTS

| | | | |
|---|---|---|---|
| 2,061,367 | 11/1936 | Morton | 65/179 X |
| 2,616,221 | 11/1952 | Hanson | 65/178 |
| 3,236,618 | 2/1966 | Allman | 65/178 |
| 3,343,935 | 9/1967 | Keefer et al. | 65/178 X |
| 3,367,761 | 2/1968 | Zitkusa | 65/178 |
| 3,498,779 | 3/1970 | Hathaway | 65/178 X |

*Primary Examiner*—Robert L. Lindsay, Jr.
*Attorney, Agent, or Firm*—Sughrue, Rothwell, Mion, Zinn & Macpeak

[57] ABSTRACT

In a glass melting tank stirrers are provided between the refining and conditioning zones. The stirrers extend side by side across the path of forward glass flow and are driven by a motor so that they rotate about vertical axes out of phase with each other.

2 Claims, 10 Drawing Figures

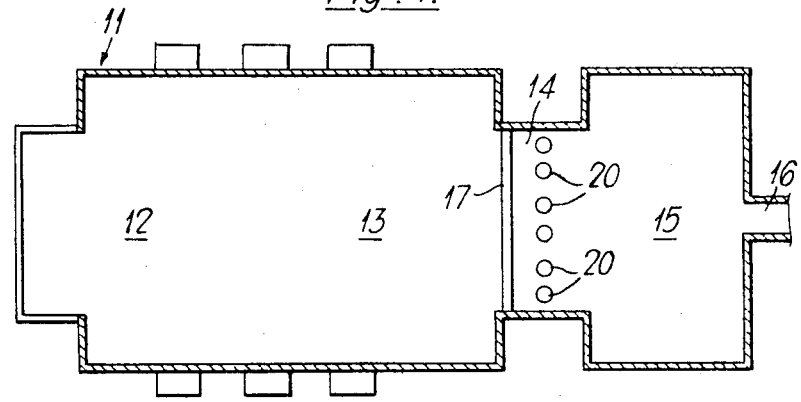
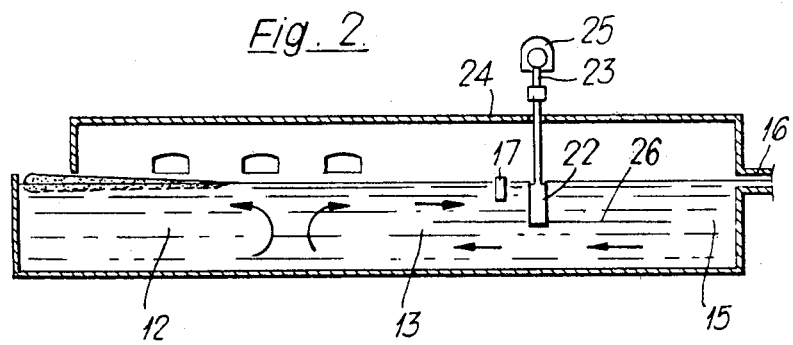
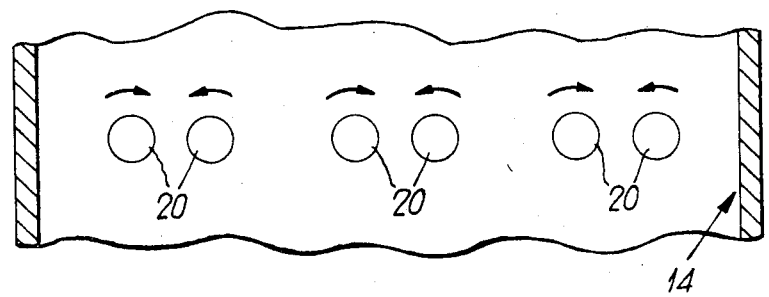

GLASS MELTING

BACKGROUND OF THE INVENTION

The invention relates to glass melting and in particular to a glass melting furnace and the operation thereof.

In the manufacture of glass in tank furnaces, unmelted bath is fed onto an established bath of molten glass at one end of the furnace where it is melted. The molten glass, which forms from the batch, passes down the furnace from the melting zone through refining and conditioning zones and is drawn off from the other end of the tank to be used in a glass forming process in known manner.

It is difficult in practice to obtain completely homogeneous glass in a glass melting tank. If the glass contains discontinuities of properties, either chemical or physical, it is considered inhomogeneous. Such discontinuities may arise from undissolved solids and gases, differences in composition due to differential glass processing or alternatively variations of physical conditions such as temperature. The difficulty in avoiding inhomogeneity increases at high loads when time and temperature in a particular zone are limited by furnace design and refractory constraints. The glass produced is generally heterogeneous in composition, to a lesser or greater degree, depending upon the efficiency with which melting and subsequent operations are accomplished. Glass varying in composition, forms layers in the furnace these layers being subject to convective and other flows imposed by the furnace operation, design and other physical operations carried out on the glass. In the final product these layers are generally parallel to the glass surfaces but there may be deviation from this parallel state in areas which have been subject to other modifying conditions. Where the layers of inhomogeneity cease to be parallel or continuous to the faces of the glass, optical faults occur.

SUMMARY OF THE INVENTION

We have found that the flow conditions can be modified and thereby reduce the severity of composition inhomogeneity by attenuating, or horizontally stretching so as to reduce the thickness of, the layers of ream. It is believed that the stirring action results in homogenisation, because it increases the length of the flow path of the glass melt through the tank, and hence tends to attenuate the layers of glass of different composition. As these layers become thinner, diffusion between the layers increases.

It is an object of the present invention to provide an improved stirring arrangement in which improved homogenisation is achieved.

The present invention provides a glass melting tank in which glass forming materials are converted in a continuous process to a glass melt in a melting zone, and the melt is subsequently refined in a refining zone prior to reaching a working end of the tank and discharge to a forming process, said tank including stirring means located in the forward flow of glass melt in its path to the working end, the stirring means comprising at least two stirrers having blades mounted so as to be rotatable about substantially vertical axes and spaced side-by-side across the direction of forward flow, and drive means arranged to rotate the stirrers out-of-phase with one another, the blades or paddles being so shaped as to impel the glass melt forwardly and laterally but to have substantially no effect in imposing a vertical component of flow.

By "out-of-phase", we mean that the pairs of stirrers are always arranged that a transverse major axis of a paddle or a blade of one stirrer, is at an angle to the transverse major axis of a paddle or a blade of the next stirrer.

The side-by-side arrangement across the foward flow can be at 90° to the forward flow, or at an angle other than 90°.

In order that the attenuation occurs in the horizontal plane, it is desirable for the stirrers to be so shaped that they cause no significant vertical component of movement in the glass.

In order to eliminate alternative paths for the glass flow other than through the stirring zone, it is preferred to use a plurality of stirrers side-by-side across the direction of glass flow, successive stirrers being connected to rotate out-of-phase with each other. In this way, the stirrers may extend across the full width of glass flow. Furthermore, it is preferred to arrange the stirrers symmetrically with regard to the centre line of glass flow.

The speed of stirring is limited in that the stirrers must not cause bubbles in the glass at the glass stirrer interface, or substantial erosion of the refractories forming the furnace.

The tank may include a waist between the refining zone and the working end and the blades or paddles may be located in the glass flow in or adjacent the waist.

The melting zone may be connected to a point of discharge from the tank by a canal in which refining and conditioning takes place and the blades or paddles may be placed across the canal in the forward flow of glass.

The region adjacent the waist may be provided with a fluid cooled barrier situated so as to control the forward flow of molten glass into and through the waist. This means that while we prefer to place the barrier at or near the entrance to the waist, it can in some cases be also placed within or downstream of the waist.

In practice each stirrer will be mounted on a rotary shaft and the paddles or blades may be mounted eccentrically on the shaft so as to provide a greater degree of lateral movement than with symmetrically mounted paddles or blades.

The blades or paddles may be water cooled. In one embodiment the blade is formed from a loop of metal tube. The space enclosed by the loop may be filled with a plate made of material resistant to attack by the molten glass. The plate may be made of molybdenum.

In an alternative, arrangement the tube is formed from stainless steel. The tube and shaft upon which the tube is carried may alternatively be formed from mild steel and the area out of glass contact may be coated with a sprayed-on refractory or surrounded with a refractory tube to protect it from attack.

When using a plurality of stirrers, the spacing between stirrers and groups of stirrers may be adjusted in accordance with the design of stirrer e.g. number of blades, effective diameter and speed of rotation which in turn will be dependent upon the load operating conditions, and tank design.

The invention includes a method of producing molten glass comprising feeding glass forming material to one end of a glass melting tank, melting the material in a melting zone of the tank, refining and conditioning the molten glass in refining and conditioning zones before discharging the molten glass from the other end of the tank to a forming process, and stirring the molten glass in its path to the point of discharge, the stirring being effected by rotating two adjacent stirrers about substantially vertical axes spaced side-by-side across the direction of glass flow, the two stirrers being rotated out-of-phase with each other and shaped to cause horizontal movement of the glass and substantially no vertical movement.

Preferably the stirring is effected by rotating at least three pairs of stirrers arranged side-by-side across the direction of flow, the two stirrers of each pair being rotated out-of-phase with each other.

BRIEF DESCRIPTION OF THE DRAWINGS

FIG. 1 is a plan view of a glass melting tank incorporating the present invention, FIG. 2 is a vertical section along the length of the tank shown in FIG. 1, FIG. 3 is a schematic plan view of the arrangement of stirrers in the waist region of the tank.

DESCRIPTION OF THE PREFERRED EMBODIMENT

Figure 4A:
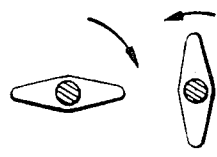
FIGS. 4a to 4d show plan view of different pairs of stirrers, which may be used in accordance with the invention.

FIGS. 1 and 2 show a glass melting tank 11 having a melting end 12 to which unmelted batch material is fed in known manner. Heat is applied in the melting region and in a refining region 13 to melt the batch material and subsequently refine the glass in the refining region 13 towards which the glass flows in a continuous process. The glass passes through a waist region 14 to a conditioning zone at the working end 15 from which the glass is withdrawn through a canal 16 to a forming process in known manner. As is also known, a floater 17 is positioned in the surface of the molten glass at the entrance to the waist region 14 and assists in providing desired circulation of glass within the refining zone 13 before passing into the working end. As is shown in FIGS. 1 and 2, a series of stirrers 20 are located in the waist region. In the particular example shown three pairs of stirrers 20 are located in the mid-part of the waist region and are symmetrically disposed relative to the central axis of flow through the waist. The stirrers each have a blade or paddle member 22 submerged in the molten glass and these may have the shapes shown in FIGS. 4a to d, which schematically illustrate alternative arrangements of multiple blade members each forming one pair of stirrers. The stirrers are spaced side-by-side across the width of the tank substantially perpendicular to the direction of flow and the spacing between adjacent pairs of stirrers is twice the spacing between the two stirrers of each pair. The relative positioning of the stirrers in this embodiment is shown in FIG. 3. In this case, the spacing between the axes of the two stirrers in each pair is 13 inches whereas the spacing between the axes of adjacent stirrers of different pairs is 26 inches.

As is shown in FIG. 2, each stirrer is mounted on a rotary shaft 23 projecting through a roof 24 of the melting furnace. The upper ends of the shafts 23 are connected via a horizontal drive shaft to a drive motor 25 which is arranged to rotate the stirrers at the same speed. As can be seen from the arrows in FIGS. 1 and 3, each stirrer is arranged to rotate in the opposite direction to the adjacent stirrer regardless of whether the adjacent stirrer is in the same pair of stirrers.

As can be seen from FIG. 2, the molten glass circulates within the tank before passing through the waist region 14. The upper part of the glass flows towards the working end 15 whereas the lower part of the glass has the return flow towards the melting end. There is a neutral line marked 26. As it is important that the stirrers 22 cause attenuation of the glass in the horizontal plane, it is necessary to limit the extent to which the stirrers are submerged in the glass and in this embodiment they are shown to just cross the neutral line 26. In this way, they do not appreciably affect the glass which flows along the return line towards the melting end. The paddles of each stirrer are so shaped that rotation of the stirrers causes forward and lateral movement of the glass but does not cause any substantial vertical component of movement to be induced in the glass.

Figure 4C:
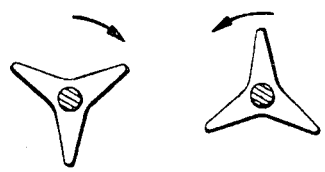
Figure 4B:
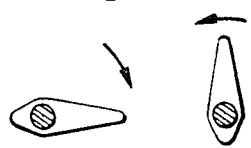
Figure 4D:
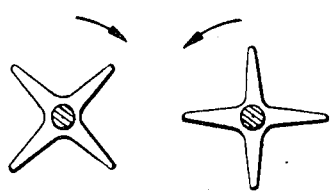

In accordance with the present invention, successive stirrers are arranged to rotate out-of-phase with each other. This can be seen clearly with reference to FIGS. 4a to d. As each stirrer has blades or paddles which are non-uniform around the axis of rotation, successive stirrers could be arranged in phase or alternatively out-of-phase. In accordance with the invention they are arranged out-of-phase and in this particular example the twin bladed stirrers of FIG. 4a are 90° out-of-phase, the three bladed stirrers of FIG. 4c are 60° out-of-phase, and the four bladed stirrers of FIG. 4d are 45° out-of-phase. In FIG. 4b the stirrers have essentially only a single blade each moulded eccentrically on the shaft and arranged 90° out-of-phase with each other. In the single blade arrangement, the blade may be entirely offset from the axis of rotation by a horizontal arm joining the blade to the stirrer shaft. It has been found that substantially improved attenuation of the glass is achieved by rotating successive stirrers out-of-phase.

In order to assess the effects of operating the stirrers out-of-phase with the various embodiments of the invention, a model of the glass melting tank was set up. The model was a 1/15th scale model of the tank as shown in FIG. 1 and the fluid used in the tank was castor oil.

The efficiency of stirring was measured as the ratio of the total length of an attenuated dye trace after passing through the stirrers to the length of the original trace which was injected upstream of the stirrers in the line of fluid flow. For example, referring to FIG. 5, if N is the number of peaks on one side of the attenuated trace after stirring and $y$ their mean width and $x$ the original length of trace before stirring, then the efficiency of stirring is taken as $$\frac{\text{Total trace length after stirring}}{\text{Original trace length before stirring}} = \frac{2N \cdot y}{x}$$

Figure 6:
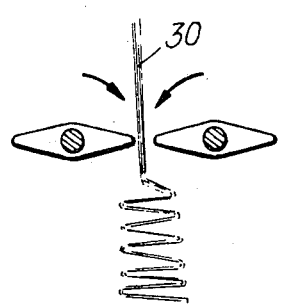
FIG. 6 shows equivalent model test results with a similar stirring arrangement not in accordance with the invention.
Figure 5:
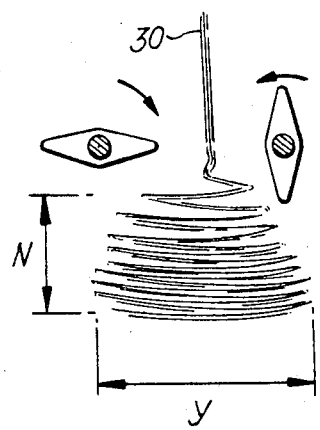
FIG. 5 shows the result of model tests corresponding to the stirring arrangement used in FIG. 1.

As can be seen from FIGS. 5 and 6, representing out-of-phase and in-phase stirring respectively, the dye traces form linear paths 30 leading up to the stirrers but on passing through the stirrers part of the trace forms a significant zig-zag pattern representing substantial attenuation and re-orientation of the original trace, the greater the efficiency of stirring the greater the degree of attenuation and the less the remaining linear trace passing straight through the stirrers unchanged in orientation; it is immediately obvious from these figures that considerably less attenuation occurs when the stirrers are operating in-phase, FIG. 6, than when the stirrers are 90° out-of-phase, FIG. 5.

Figure 7:
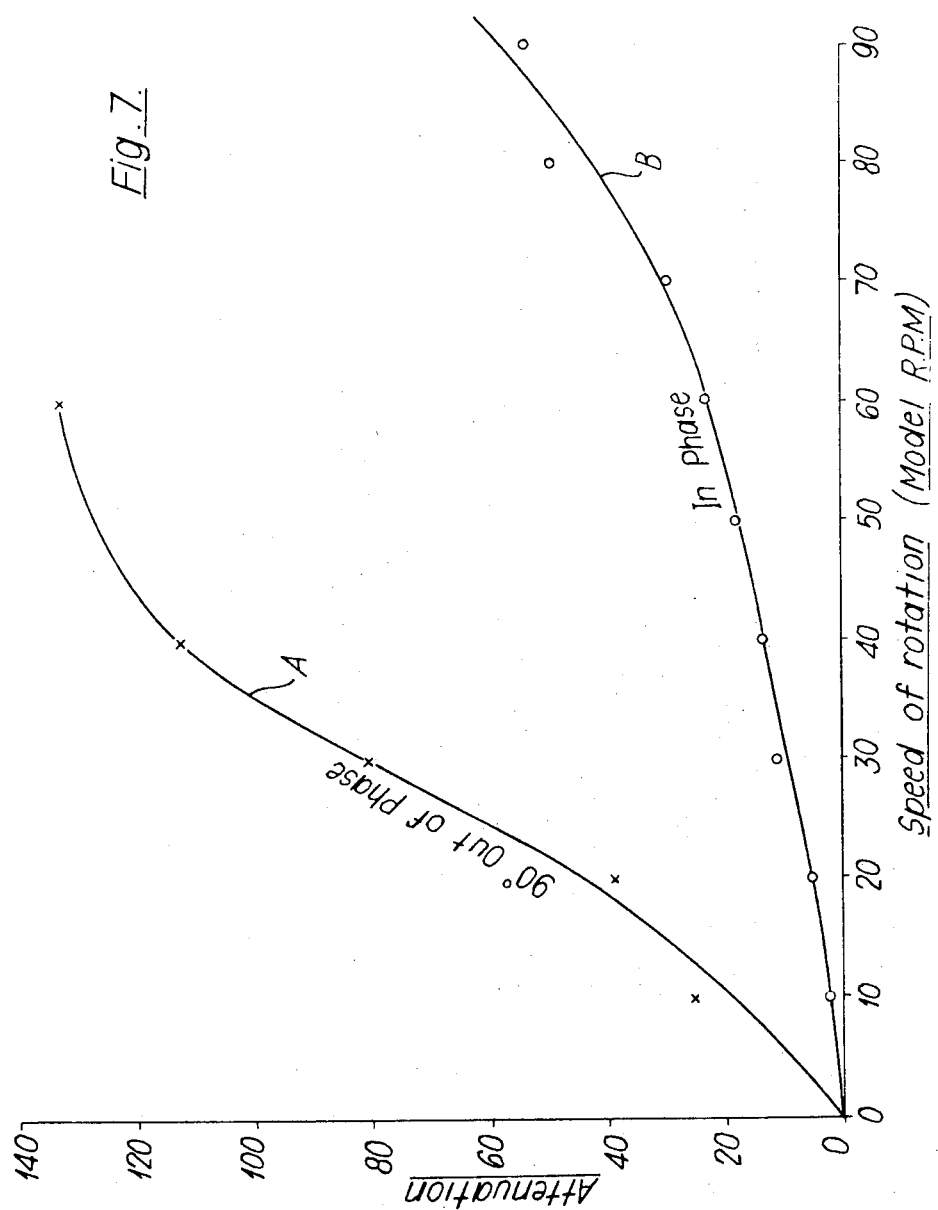
FIG. 7 is a graph showing the comparative results of the tests used in FIGS. 5 and 6.

The summary of various model tests using different speeds of rotation for stirrers shown in FIG. 4a are plotted in FIG. 7. One curve marked A shows the attenuation results achieved when the stirrers of each pair were 90° out-of-phase and the other curve B shows the attenuation when the stirrers of each pair were in-phase. As is shown, substantially improved attenuation results from the use of stirrers out-of-phase.

The invention is not limited to the details of the above examples. For instance, instead of using the six stirrers shown in FIG. 1, it is possible to use four, five, six stirrers or more arranged side-by-side across the waist region, and more than one bank of stirrers.

The arrangement of stirrers may be varied and the spacing between them may be varied. It is however desirable to maintain a symmetrical arrangement relative to the central flow line through the waist region.

The paddles of each stirrer may be mounted centrally on the axis of rotation of the stirrer. Alternatively, the paddle or blade may be mounted eccentrically on the rotary shaft supporting the blade. The blades may be water cooled. The blade may be formed from a loop of metal tube and in some cases the space contained within the loop may be filled with a plate made of material resistant to attack by the molten glass. For instance, the plate may be made of molybdenum. The tube forming the blade may be formed from stainless steel. In an alternative, the tube and shaft upon which the tube is carried may be formed of mild steel. The part of the rotary shaft projecting above the glass may be coated with a sprayed-on or preformed refractory to protect it from attack.

We claim:

1. A method of producing molten glass comprising feeding glass forming material to one end of a glass melting tank, melting the material in a melting zone of the tank, refining and conditioning the molten glass in refining and conditioning zones before discharging the molten glass from the other end of the tank to a forming process, and stirring the molten glass in its path to the point of discharge in a region of the tank where the upper region of the molten glass flows in a forward direction towards the working end and the lower region of the molten glass flows in a return direction towards the melting zone, the stirring being effected by rotating at least one pair of adjacent stirrers about substantially vertical axes spaced side-by-side across the direction of glass flow, operating each pair of stirrers by rotating them out-of-phase with each other, the stirrers being shaped to cause horizontal movement of the glass and substantially no vertical movement thereby effecting horizontal attenuation of the molten glass.

2. A method according to claim 1, wherein the stirring is effected by rotating at least three pairs of stirrers arranged side-by-side across the direction of flow, the two stirrers of each pair being rotated out-of-phase with each other.

* * * * *